US008752572B2

(12) United States Patent
Pittroff et al.

(10) Patent No.: US 8,752,572 B2
(45) Date of Patent: Jun. 17, 2014

(54) BUNDLE TRAILER FOR GAS DELIVERY

(75) Inventors: Michael Pittroff, Seoul (KR); Yuk-Hwan Park, Ulsan (KR); Woo-Jin Cho, Busan (KR)

(73) Assignee: Solvay Flour GmbH, Hannover (DE)

( * ) Notice: Subject to any disclaimer, the term of this patent is extended or adjusted under 35 U.S.C. 154(b) by 402 days.

(21) Appl. No.: 13/125,273

(22) PCT Filed: Oct. 22, 2009

(86) PCT No.: PCT/EP2009/063867
§ 371 (c)(1),
(2), (4) Date: Apr. 20, 2011

(87) PCT Pub. No.: WO2010/046428
PCT Pub. Date: Apr. 29, 2010

(65) Prior Publication Data

US 2011/0226368 A1 Sep. 22, 2011

Related U.S. Application Data

(60) Provisional application No. 61/108,195, filed on Oct. 24, 2008.

(30) Foreign Application Priority Data

Dec. 9, 2008 (EP) .................................... 08171051

(51) Int. Cl.
*B60P 3/22* (2006.01)

(52) U.S. Cl.
USPC .......................................... 137/259; 137/267

(58) Field of Classification Search
USPC .......................... 137/259, 266, 267, 255, 899
See application file for complete search history.

(56) References Cited

U.S. PATENT DOCUMENTS

| | | | | |
|---|---|---|---|---|
| 2,011,347 | A * | 8/1935 | Ragonnet | 137/267 |
| 2,761,397 | A | 9/1956 | Holst | |
| 3,863,460 | A | 2/1975 | Straile et al. | |
| 4,045,180 | A * | 8/1977 | Young et al. | 137/266 |
| 4,784,399 | A | 11/1988 | Finn | |
| 4,977,921 | A * | 12/1990 | Knight et al. | 137/266 |
| 5,539,998 | A | 7/1996 | Mostowy et al. | |
| 5,954,099 | A | 9/1999 | Princiotta et al. | |
| 6,367,573 | B1 | 4/2002 | Scott | |
| 7,201,179 | B2 * | 4/2007 | Barr et al. | 137/255 |
| 7,784,485 | B2 * | 8/2010 | Schelling et al. | 137/266 |
| 2002/0046547 | A1 | 4/2002 | Bishop et al. | |

FOREIGN PATENT DOCUMENTS

| | | | |
|---|---|---|---|
| DE | 2006000628 | A1 | 7/2007 |
| GB | 2310713 | A | 9/1997 |
| KR | 20030014870 | A | 2/2003 |
| WO | WO 2004023028 | A1 | 3/2004 |
| WO | WO 2005005877 | A1 | 1/2005 |
| WO | WO 2008081401 | A1 | 7/2008 |

(Continued)

*Primary Examiner* — Kevin Lee

(57) ABSTRACT

A bundle trailer for containers including (i) a supporting frame on which a plurality of bundles are located; (ii) a plurality of bundles, each bundle comprising: a bundle frame, a plurality of containers containing a chemical, and at least one bundle value for controlling delivery of the chemical in the containers; (iii) at least one trailer valve; and (iv) at least one clamp for fixing the bundle is disclosed. The bundle trailer is capable of delivering high purity hygroscopic, corrosive chemicals, such as elemental fluorine and mixtures thereof, with good flexibility, high safety, and low cost.

16 Claims, 4 Drawing Sheets

(56) References Cited

FOREIGN PATENT DOCUMENTS

| | | | |
|---|---|---|---|
| WO | WO 2012/004194 | A1 | 1/2012 |
| WO | WO 2012/004195 | A1 | 1/2012 |
| WO | WO 2012/034979 | A2 | 3/2012 |
| WO | WO 2012/035003 | A1 | 3/2012 |

* cited by examiner

BUNDLE TRAILER FOR GAS DELIVERY

CROSS-REFERENCE TO RELATED APPLICATIONS

This application is a U.S. national stage entry under 35 U.S.C. §371 of International Application No. PCT/EP2009/06867 filed Oct. 22, 2009, which claims priority to U.S. provisional application No. 60/108,195 filed Oct. 24, 2008 and to European Application No. 08171051.9 filed Dec. 9, 2008, each of these applications being herein incorporated by reference in its entirety for all purposes.

TECHNICAL FIELD

The present invention relates to a trailer, typically attached to a truck, for storing or transporting fluid containers, more particularly to a trailer for containers of compressed gas.

BACKGROUND ART

Hygroscopic, corrosive chemicals are frequently used in sophisticated semiconductor, flat panel, photovoltaic and automotive fabrication processes. Typical of such a chemical is fluorine which is a gas, which reacts strongly in moist air. Bulk fluorine or its mixtures is shipped as a compressed gas in special containers, e.g., in tube trailers or cylinders. Since fluorine is the most electronegative and reactive of all elements, it is highly reactive, in particular corrosive and reacts with practically all organic and inorganic substances.

Korean Patent Laid-Open Publication No. 10-2002-14870 discloses an apparatus and methods for transfer and delivery of high purity chemicals including elemental fluorine, as well as a system for supplying gases for fabrication of a semiconductor comprising a tube trailer in which a plurality of gas tanks are combined.

U.S. Pat. No. 5,539,998 discloses an apparatus for transfer and delivery of a hygroscopic, corrosive chemical from an elevated pressure source of supply to a lower pressure use point. The apparatus includes: (a) a delivery conduit for connection to a source of supply of a chemical and to the use point; (b) a dehydrator connected in the delivery conduit for removing moisture from the chemical passing through the conduit; (c) at least one pressure regulator connected in the delivery conduit to reduce the pressure from the elevated pressure source of supply to the lower pressure use point; (d) at least one means to heat the chemical passing through at least one pressure regulator; and (e) a vacuum means for evacuating the delivery conduit in an operation of connecting the delivery conduit to the source of supply and/or the use point.

There have been attempts in the corrosive chemical delivery industry to provide a highly pure chemical gas using a tube trailer including several tubes in which each tube has a capacity of 50 to 100 kg. Despite the use of such tube trailers, the industry has experienced problems with unstable safety control, high maintenance cost, and low compatibility with systems having various use points, etc.

The present invention overcomes these shortcomings of the prior art using a unique integration of bundles. Further, the present invention is capable of delivering high purity hygroscopic, corrosive chemicals, such as elemental fluorine and mixtures of $N_2$, Ar, He with elemental fluorine, with good flexibility, high safety, and low cost.

An object of the present disclosure is to provide a bundle trailer where the containers are supported in bundles which can be individually removed from the trailer and which will facilitate the removal of any container.

Another object of the invention is to provide bundles which can be readily affixed to the trailer frame and are inherently capable of accommodating inertial loads imposed by the containers.

With these and other objects in view, as will be apparent to those skilled in the art, the present disclosure resides in the combination of parts as set forth in the specification and particularly pointed out in the claims.

DISCLOSURE OF THE INVENTION

The present invention relates to a bundle trailer having a plurality of cylindrical-container-bearing bundles having a bundle frame on which a plurality of containers containing a chemical are mounted. Each bundle has at least one pneumatic bundle valve for controlling the delivery of a chemical product in the containers. At its end, the bundle trailer of the present disclosure further includes at least one trailer valve for controlling the main stream of the chemical and at least one clamp for fixing the bundles. In some embodiments, the above valves of the bundle trailer may be configured to be opened remotely to ensure higher safety for the workers compared to a manual opening configuration.

Trailers, which are known in the art, have a flat horizontal frame on which a bottom layer of containers is supported. Successive layers are stacked up with lower containers supporting those above to form a compact bundle. Supports are frequently provided at spaced intervals along the container length and retainers are used to secure the bundle to the frame. At one end of the trailer, the container ends are generally manifolded and piping is provided for supplying gas to and withdrawing compressed gas from the containers.

In one embodiment, the bundle trailer further includes a wing body (20) on which the bundle trailer is loaded. In some embodiments, the wing body comprises a battery (21) for the operation of electronic devices (22) necessary for the bundle trailer, where the electronic devices are selected from the group consisting of an automatic door, a siren lamp, a detector for the chemical, or a combination thereof. Specifically, as U.S. Pat. No. 5,539,998 indicates, appropriate sensors, such as thermocouples and pressure transducers, may be provided for the bundle trailer so that the ambient temperature at the bundle trailer, the temperature of the chemical from the tube trailer or source of supply, and the relative change in pressure over selected time intervals are sensed and transmitted to an appropriate controller. When the sensed values exceed the prescribed preset values, the controller provides an appropriate alarm signal from an appropriate device attached in the wing body.

The bundles are positioned on the supporting frame so that they are safe and stable during gas supply, delivery, and unloading operations.

Figure 1:
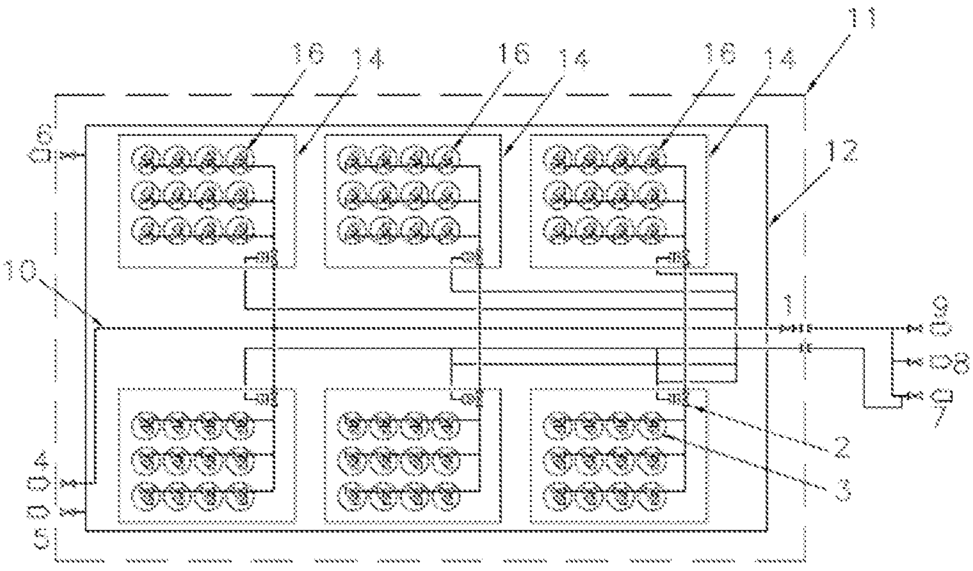
FIG. 1 is a schematic illustration of an embodiment of the chemical transfer and delivery apparatus of the present disclosure.
Figure 2:
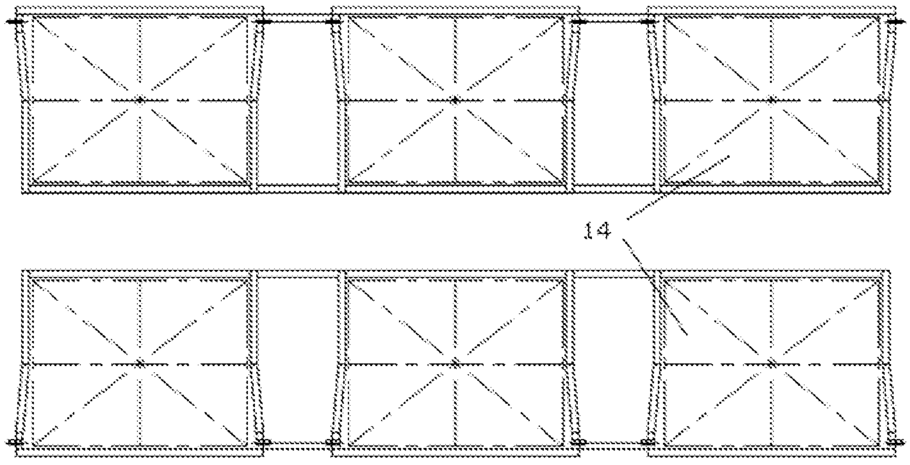
FIG. 2 is a front view of a bundle trailer with containers embodying the principles of the present disclosure.
Figure 3:
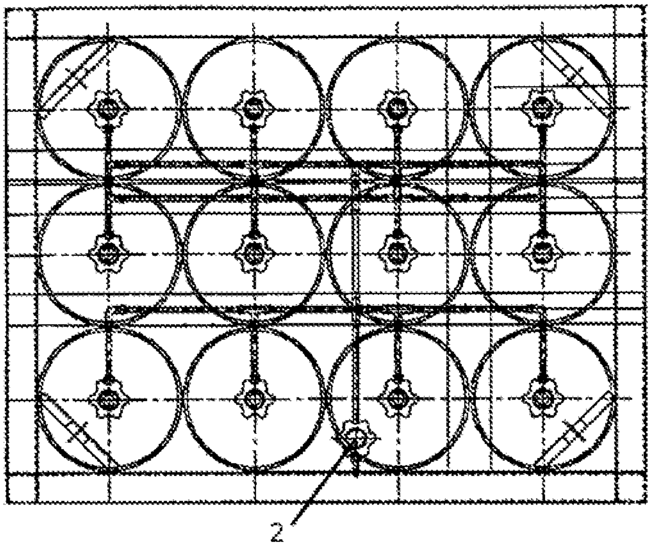
FIGS. 3-5 are front and plain elevational views of the bundle trailer with containers.
Figure 4:
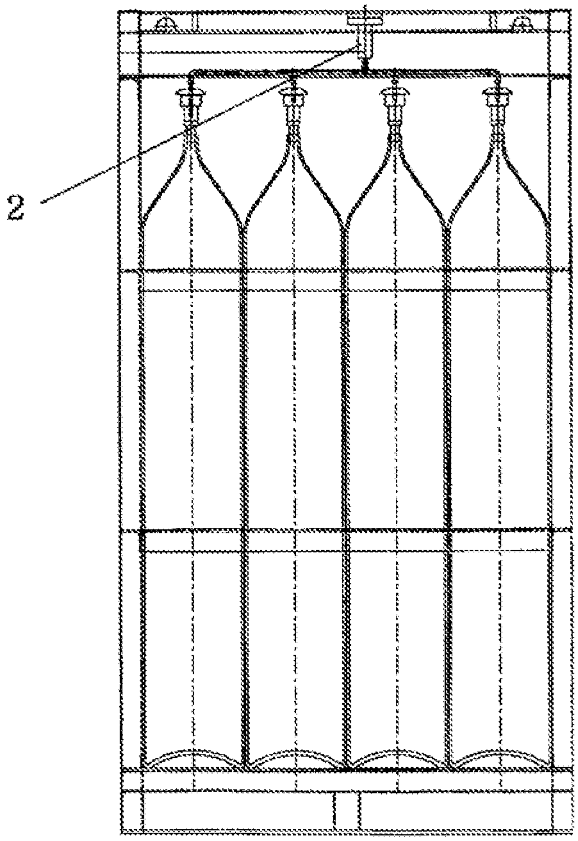
Figure 5:
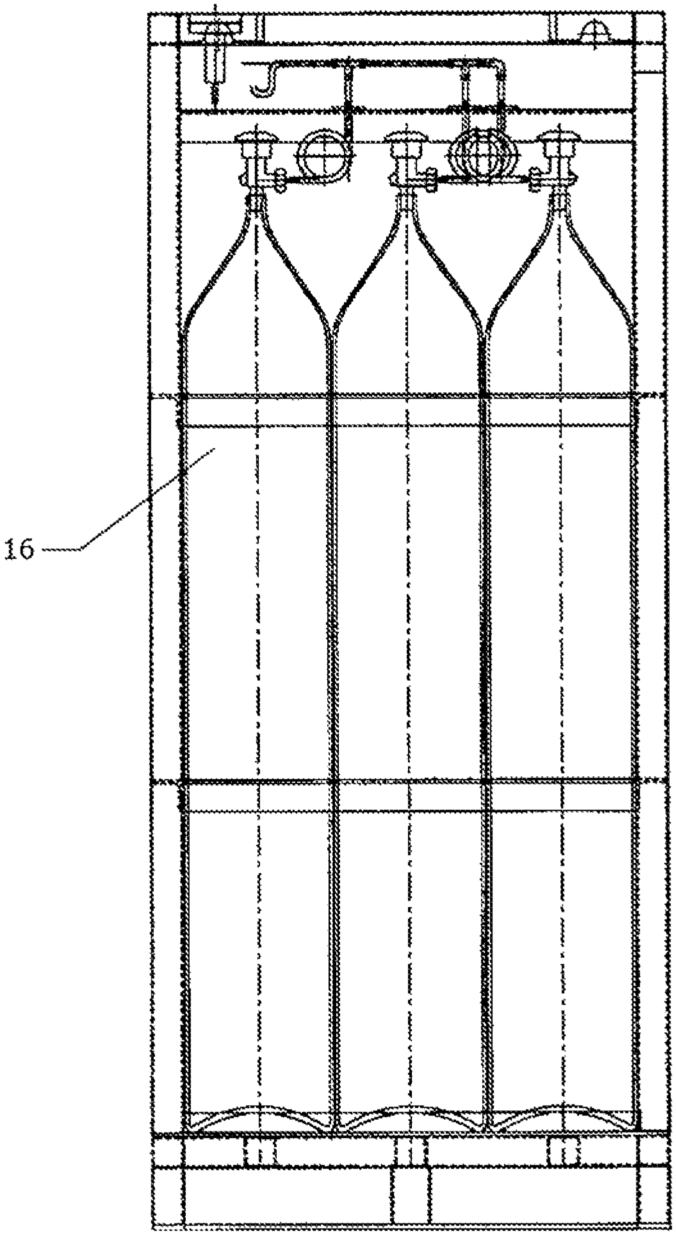
Figure 6:
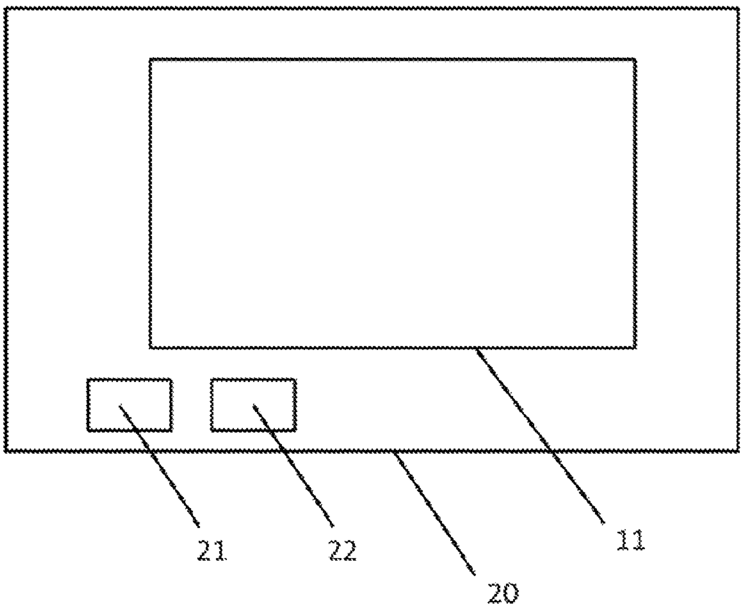
FIG. 6 is a schematic diagram of a bundle trailer in a closed space formed by a wing body.

While the bundle trailer of the present invention is suitable for fluids in general, it is particularly useful for compressed gases, notably reactive and/or corrosive gases, such as $F_2$, and its mixtures with $N_2$ and/or noble gases, in particular argon, and will be described with respect to that application. In FIGS. 1 and 2, the bundle trailer, indicated generally by reference numeral (11), has a generally horizontal, supporting frame (12) upon which a plurality of container bundles (14) are supported. In some embodiments, the number of the container bundles ranges from about 6 to about 16 within one frame. The bundles are comprised of a plurality of gas-containing containers (16), which are preferably of elongated, cylindrical geometry and the edges of which generally reduce to cylindrical ends of a smaller cross section. Each bundle has generally about 2 to about 40, about 3 to about 30, or about 4 to about 20 containers, each of which has a capacity of about 10 to about 100 kg, about 15 to about 50 kg, about 18 to about 27 kg, or about 26, in particular about 26.4 kg. In another embodiment, a bundle may contain a single vertical or horizontal column of containers or multiple columns of containers, which may be suitable for a particular application, as illustrated in FIGS. 3-5.

The present invention will now be described with regard to a certain embodiment as illustrated in FIG. 1. Container ends are fitted with container valves (3) for admitting gas to and withdrawing gas from the containers and for relieving excess pressure. Further, in order to control flow of the chemical, each bundle has at least one bundle valve (2), and the bundle trailer has at least one trailer valve (1).

Trailer valve (1) is generally connected on the trailer side to a main pipe which is connected to the different bundle valves (2) and receives the chemical from the container bundles (14) during discharge of chemical. The main pipe can be connected to a further gas supply valve (4) through which, for example, inert gas, in particular nitrogen can be supplied. On the delivery side, the trailer valve can be connected to product supply valve (9) through which in particular F2/N2 mixture can be supplied. Through gas supply valve (7), for example, inert gas, in particular nitrogen can be supplied to the container bundles (14) for example to ensure pressure equilibrium during discharge of chemical. An outlet valve (8) can be connected to a system allowing for destruction of the chemical, for example a scrubber, so as to allow for example for purging the bundle trailer or pressure release to the atmosphere. In a particular embodiment, a trailer gas supply valve (5) through which inert gas can be supplied allows to create an inert atmosphere in a closed space surrounding the container bundles. In a further embodiment, a suction valve (6) allows to connect a means for evacuating the gas in said closed space, if desired e.g. in case of leakage of chemical into said closed space. The means for evacuating the gas can be suitably connected to a system allowing for destruction of the chemical, for example a scrubber. Preferably the bundle trailer is equipped both with trailer gas supply valve and suction valve. Said closed space can be formed for example by means of a wing body and in that case said wing body is suitably equipped with said trailer gas supply valve (5) and/or said suction valve (6).

In certain embodiments, the components on the high pressure side of the delivery system may be manufactured from a nickel base alloy, such as Monel 400. However, at cylinder pressures of approximately 125 psig, these components can also be made of standard materials known to be compatible with corrosive chemicals such as fluorine at ambient temperatures, such as stainless steel, brass, or copper. The lower pressure side of the pressure controlling device may have components made of any of the above described metals. Polymeric and fluoropolymeric materials should preferably not be used in valve seats and O-rings. Valves and orifices may be made of metallic or ceramic materials.

The bundle trailer of the present disclosure may further include any appropriate equipment known in the art, such as angle guides for bundle loading, a dehydrator, a pressure regulator, etc., as necessary.

In a particular embodiment, during a loading operation, bundles having containers which are filled with an object chemical are loaded by a suitable equipment such as a forklift, and each of them is fixed with a fixing means, e.g., fasteners or bolts. Then, caps attached to a main pipe for supplying the chemical are removed, and bundle valves 2 and a main pipe of the bundle trailer are connected together. Since it is much safer to purge the conduit between a trailer valve and a bundle with an inert gas such as nitrogen, the main pipe is offers connected to a pipe for supplying nitrogen gas when the trailer valve is open. The trailer valve is closed when $N_2$ pressure reaches a specific value, e.g., about 150 bar.

In a supplying operation, upon checking for any leakage of the chemical, the following procedures may be applied:

(a) the trailer valve and a connection part of the customer site is connected, and a bundle valve (2) is open so that the bundle container and the main pipe have identical pressures;

(b) a trailer valve (1) is opened to remove nitrogen gas filled in the main pipe;

(c) the bundle valve (2) and trailer valve (1) are closed; then, a container valve (3) and bundle valve (2) are sequentially opened;

(d) the trailer valve (1) is opened to supply fluorine gas until the supply is completed; and (e) the trailer valve (1), bundle valve (2), and container valve (3) are sequentially closed and, upon connecting the trailer valve to the $N_2$ pipe, the conduit between the trailer and bundle valves is purged with $N_2$.

In an unloading operation, the conduit is connected to a scrubber (suction) line so that nitrogen in the conduit can be removed. Contaminants and purge gas are withdrawn through a scrubber (8) by a vacuum pump and sent to a separate scrubbing system (not illustrated). The vacuum pump may be protected from corrosive chemicals by appropriate placement of a filter upstream of the vacuum pump (not illustrated).

Although the invention has been described in detail with reference to certain embodiments, those skilled in the art will recognize that there are other embodiments within the spirit and scope of the claims.

The invention claimed is:

1. A bundle trailer for containers comprising:

a supporting frame on which a plurality of bundles are located;

a plurality of bundles, each bundle comprising a bundle frame, a plurality of containers containing a chemical, and at least one bundle valve for controlling delivery of the chemical in the containers;

at least one trailer valve; and at least one gas supply valve different from said at least one trailer valve.

2. The bundle trailer according to claim 1, wherein said bundle trailer is surrounded by a closed space formed by a wing body.

3. The bundle trailer according to claim 2, wherein the wing body comprises a battery for operation of electronic devices.

4. The bundler trailer according to claim 3, wherein the electronic devices are selected from the group consisting of an automatic door, a siren lamp, a detector for the chemical, and a combination thereof.

5. The bundler trailer according to claim 1, wherein each bundle comprises 2 to 40 containers.

6. The bundler trailer according to claim 5, wherein each bundle comprises 4 to 20 containers.

7. The bundler trailer according to claim 1, wherein the chemical is selected from the group consisting of F2, N2, a noble gas and a combination thereof.

8. The bundle trailer according to claim 1, wherein each container has a capacity of about 10 to about 100 kg.

9. The bundle trailer according to claim 8, wherein each container has a capacity of about 18 to 27 kg per container.

10. The bundle trailer according to claim 1, wherein at least one container has a cylindrical shape.

11. The bundle trailer according to claim 1, wherein the containers are arranged vertically in line, horizontally in line, or both.

12. The bundle trailer according to claim 1, wherein the bundle and trailer valves are configured to be opened remotely.

13. The bundle trailer according to claim 4, wherein one electronic device is a detector for the chemical, and wherein the detector sets off an alarm as soon as a leakage of the chemical occurs.

14. The bundle trailer according to claim 1, wherein the number of the bundles ranges from about 6 to about 16 within one frame.

15. The bundle trailer according to claim 9, wherein each container has a capacity of about 26 kg per container.

16. The bundle trailer according to claim 10, wherein each container has a cylindrical shape.

* * * * *